United States Patent [19]

Kitahara et al.

[11] Patent Number: 4,476,144
[45] Date of Patent: Oct. 9, 1984

[54] PROCESS FOR PRODUCING CONCENTRATED SHOYU

[75] Inventors: Seiji Kitahara; Keitaro Mogi; Thoziro Shimada, all of Noda; Fumio Noda, Kamagaya; Yoshihiro Tateyama, Noda, all of Japan

[73] Assignee: Kikkoman Corporation, Noda, Japan

[21] Appl. No.: 393,861

[22] Filed: Jun. 30, 1982

[30] Foreign Application Priority Data

Jul. 10, 1981 [JP] Japan ................................ 56-107146

[51] Int. Cl.$^3$ .......................... A23L 1/20; A23L 1/238
[52] U.S. Cl. ........................................ 426/46; 426/61; 426/589
[58] Field of Search ...................... 426/44, 46, 49, 52, 426/589, 60, 62, 51; 435/245, 244

[56] References Cited

U.S. PATENT DOCUMENTS 3,711,303 1/1973 Luksas et al. .......................... 426/46
3,873,730 3/1975 Luksas et al. ....................... 426/589
3,878,302 4/1975 Luksas et al. ....................... 426/589

FOREIGN PATENT DOCUMENTS 44-2139969 12/1969 Japan.
52-18897 2/1977 Japan.

OTHER PUBLICATIONS

Prescott et al., Industrial Microbiology, 4th Ed., 1982, p. 498.

Primary Examiner—Raymond Jones
Assistant Examiner—Marianne S. Minnick
Attorney, Agent, or Firm—Banner, Birch, McKie & Beckett

[57] ABSTRACT

A process for producing concentrated shoyu which comprises adding and mixing a shoyu koji into the juice separated from a shoyu moromi in the early stage of brewing, used as a brewing water, and then carrying out fermentation and ageing according to the usual method.

3 Claims, No Drawings

PROCESS FOR PRODUCING CONCENTRATED SHOYU

This invention relates to a process for producing a shoyu having a high nitrogen concentration, namely a concentrated shoyu.

In the field of seasonings such as shoyu and so on, there is a tendency of demanding higher concentration and higher quality in the recent years. However, according to the usual brewing process of shoyu (hereinafter, it is referred to as "usual process"), namely according to the production process of shoyu which comprises inoculating an approximately 1:1 mixture of cooked soybeans and parched and crushed wheat with shoyu koji fungi and culturing it for about 40 hours to obtain a shoyu koji, followed by charging the resulting shoyu koji into 1.5 times its weight of aqueous sodium chloride solution, carrying out fermentation and ageing at about 25°–30° C. for 4–8 months with intermittent agitation and then pressing and filtering the fermented mixture, it is quite difficult to obtain a nitrogen concentration of 2.0% or more.

As typical examples of concentrated shoyu, there can be referred to the Tamari shoyu predominantly consumed in the Nagoya area of Japan which is produced from soybeans as main starting material, as well as the Kanro shoyu (re-brewed shoyu) of Yamaguchi area of Japan which is obtainable by charging koji into raw shoyu used as a brewing water. However, Tamari shoyu is different in flavor and taste from usual shoyu because of the unique formulation of starting materials. As to Kanro shoyu, it has a deep color, because raw shoyu, which has once completed fermentation, is used as brewing water there. Further, it is extremely low in the extent of alcohol fermentation because of the fermentation-inhibitory substances such as phenolic substances present in the raw shoyu. Further, due to its low pH, the dissolution of nitrogen component, particularly the formation of glutamic acid constituting the important taste component of shoyu, is not active, so that persons not familiar to this shoyu feel its flavor quite inferior to that of usual shoyu. Further, it has a fault that the period of brewing is very long.

Apart from above, there are also known various processes such as the process of Japanese patent application Kokai (Laid-Open) No. 18,897/77 which comprises carrying out digestion at a low sodium chloride concentration by using a combination of a protein-decomposing enzyme composition and a shoyu koji, then adding thereto a shoyu moromi and finally carrying out ageing, the process of Japanese patent publication No. 21,399/69 which comprises charging koji into an aqueous amino acid solution obtained by decomposing starting protein with a mineral acid, and so on. However, those products also have unique decomposition odors so that their flavors are entirely different from the flavor of usual shoyu produced by the natural brewing. Further, their production necessitates complicated procedures or takes a long period of time. Accordingly, these processes still cannot be said to be satisfactory.

In view of above, the present inventors conducted a study on the process for producing concentrated shoyu. As the result, it was found that, by adding and mixing usual shoyu koji into a juice separated from the moromi of early brewing stage of usual shoyu, said juice being used as a brewing water, and thereafter carrying out fermentation and ageing by the usual method, a concentrated shoyu of which flavor is not inferior and rather superior to that of usual shoyu produced by the natural brewing process can easily be obtained without employing any special procedure nor special apparatus. Based on the above-mentioned finding, this invention was accomplished.

This invention will be illustrated below more concretely.

In the process of this invention, a juice separated from the moromi of the early brewing stage of usual shoyu is used as a brewing water. As used herein, the term "moromi of the early brewing stage of usual shoyu" means a moromi yet in the stage before fermentation and yet keeping a light color in which dissolution of nitrogen has progressed to some extent and of which pH is not yet very low. Thus, moromis 15–60 days after charge, and preferably moromis 20–40 days after charge, are used in the invention.

In a moromi younger than 15 days after charge, the digestion of raw material is yet insufficient, so that it is difficult to separate juice therefrom. In a moromi older than 60 days after charge, the coloration is in an advanced stage, so that it gives a final product having a deep color. Further, the latter moromi has a low pH value, so that the formation of glutamic acid and the alcohol fermentation are suppressed by it and a product having good flavor and taste cannot be obtained. Further, the fermentation takes a long period of time, if it is used.

In the usual shoyu moromi, lactic acid fermentation starts about 20 days after charge and it reaches a peak about 40 days after charge. During this period, the moromi has a pH value of 6.0–5.0 and the nitrogen concentration in the juice reaches 1.50–1.80%. Although the above-mentioned values may vary to some extent with the season of brewing (summer season, winter season, etc.) and the method of charging (cold charging, etc.), the characteristic properties of shoyu moromis almost always fall into the above-mentioned ranges, so far as they are 20–60 days after charge and are yet before the start of fermentation.

In separating the juice from such a shoyu moromi of the early brewing stage, the juice may be taken out by filtration under pressure. However, since the juice may contain some quantity of solid substance (moromi), it is also allowable to directly withdraw a part of the juice from the morimi residing in the tank by means of a pump or the like. The moromi from which a part of juice has been withdrawn can be fermented and aged by the usual method to obtain a usual shoyu.

The juice which has been separated from the moromi in the early stage of brewing is directly diluted with water or an aqueous solution of sodium chloride to obtain a brewing water. The brewing water preferably has a sodium chloride concentration of 12–25% and a nitrogen concentration of 0.2–1.8%.

In the usual processes, a brewing water having a sodium chloride concentration of about 23–25% is used for the purpose of preventing rottening. However, the brewing water used in this invention is free from the danger of rottening even at a low concentration of sodium chloride, because it has a high nitrogen concentration. Therefore, a brewing water having a sodium chloride concentration of about 13% is also usable, by which a concentrated shoyu of low-salt concentration can also be produced.

Then, usual shoyu koji is charged into the brewing water thus prepared, in a proportion that the amount of brewing water comes to 1.25-6.25 times the weight of koji. Thereafter, in the same manner as in shoyu moromi of usual process, agitation by compressed air at 6-10 psi for 5-10 minutes is appropriately carried out once a week at 25°-30° C. to continue fermentation and ageing for 4-6 months, after which the fermented mixture is filtered under pressure to obtain a concentrated shoyu. It is needless to say that shoyu yeast, lactobacillus or the like may optionally be added in this period.

As referred to herein, the shoyu koji can be obtained by inoculating shoyu koji fungi on a mixture of cooked soybeans and parched and crushed wheat (the proportion of the mixing is 6:4 to 4:6, and usually nearly 1:1) and culturing the mixture for 30-60 hours (usually about 40 hours). As said shoyu koji fungus, any commercial products may be used. Usually, however, Aspergillus sojae, Aspergillus oryzae, and the like are used.

As set forth above in detail, this invention enables to obtain a concentrated shoyu having the same flavor as that of usual shoyu by a simple means of using the juice separated from shoyu moromi in the early brewing stage as a brewing water. As compared with the prior processes for producing Tamari shoyu, Kanro shoyu and other processes using enzyme composition or the like, the process of this invention for producing concentrated shoyu is much superior in product and process.

The invention is further described below in detail with reference to Examples, but the invention is not limited thereto. In the examples, analytical values have been determined according to the "Standard Shoyu Analysis" (Nippon Shoyu Gijutsu Kai), unless otherwise specified.

EXAMPLE 1

Defatted and cooked soybeans was mixed with an equal amount of parched and crushed wheat. The mixture was inoculated with seed koji and made into koji with aeration to obtain a usual shoyu koji. Its 150 kg portion was charged into 235 liters of 25% aqueous sodium chloride solution, and then fermentation and ageing were carried out at 25°-30° C. with intermittent stirring in the usual manner. When (1) 20 days, (2) 30 days, (3) 60 days, (4) 90 days and (5) 120 days had passed after the charging, the resulting moromi was filtered under pressure to obtain juices. Their analyses were as shown in Table 1.

TABLE 1

| Day No. of brewing | Sodium chloride (%) | Total Nitrogen (%) | Value[1] | Nitrogen utilization rate[2] |
|---|---|---|---|---|
| 1 | 20 | 16.65 | 1.605 | 6.25 | 81.0 |
| 2 | 30 | 16.70 | 1.632 | 5.75 | 83.9 |
| 3 | 60 | 16.80 | 1.775 | 3.95 | 89.0 |
| 4 | 90 | 16.98 | 1.823 | 3.63 | 90.6 |
| 5 | 120 | 17.05 | 1.827 | 3.17 | 90.2 |

[1]Value: Calculated from transmittance measured for the whole wavelengths in the visible region at a liquid layer length of 10 mm.

[2]Nitrogen utilization rate = $\frac{\text{Total nitrogen in juice}}{\text{Total nitrogen in the used raw material}} \times 100$ Then concentrated raw shoyu and concentrated raw shoyu of low-salt concentration were produced by adjusting the sodium chloride concentration of these juices to 16.3% or 18.2% and their concentration of total nitrogen (hereinafter, referred to as T.N.) to 1.56% by adding aqueous sodium chloride solution thereto to obtain brewing waters, followed by adding and mixing 80 kg of the same usual shoyu koji as above to 240 liters of each brewing water, carrying out fermentation and ageing at 25°-30° C. for 6 months with intermittent stirring by compressed air at 6-10 psi for 5-10 minutes once a week, and filtering the moromi under pressure.

Their analyses were as shown in Table 2.

TABLE 2

| | | Brewing water | | Raw shoyu | | | | |
|---|---|---|---|---|---|---|---|---|
| Sample | | NaCl (%) | T.N. (%) | NaCl (%) | T.N. (%) | RS* (%) | Alc (%) | Value |
| 1 | A | 16.30 | 1.560 | 12.50 | 2.330 | 4.62 | 3.13 | 2.68 |
|   | B | 18.20 | 1.562 | 15.10 | 2.220 | 4.88 | 2.90 | 2.68 |
| 2 | C | 16.30 | 1.559 | 12.55 | 2.320 | 4.60 | 3.12 | 2.51 |
|   | D | 18.20 | 1.560 | 15.00 | 2.200 | 4.75 | 3.00 | 2.68 |
| 3 | E | 16.30 | 1.558 | 12.70 | 2.290 | 5.15 | 2.75 | 1.99 |
|   | F | 18.20 | 1.559 | 15.30 | 2.180 | 6.20 | 2.30 | 2.34 |
| 4 | G | 16.30 | 1.562 | 12.86 | 2.250 | 5.70 | 2.55 | 1.85 |
|   | H | 18.20 | 1.559 | 15.40 | 2.180 | 6.40 | 2.20 | 1.53 |
| 5 | I | 16.30 | 1.560 | 12.84 | 2.230 | 5.80 | 2.55 | 1.53 |
|   | J | 18.20 | 1.560 | 15.40 | 2.140 | 6.50 | 1.98 | 1.69 |

*RS: Reducing Sugar

These raw concentrated shoyus and raw concentrated shoyus of low-salt concentration were pasteurized at 80° C. for 60 minutes to obtain shoyus, of which falvors were evaluated according to ranking method by a panel consisting of 15 persons to obtain the results shown in Table 3.

TABLE 3

| | Sample | | | | |
|---|---|---|---|---|---|
| Concentrated shoyu of low-salt concentration | Sample | A | C | E | G | I |
| | Ranking | 2 | 1 | 3 | 4 | 5 |
| | Total point | 31 | 26 | 41 | 59 | 68 |
| Concentrated shoyu | Sample | B | D | F | H | J |
| | Ranking | 1 | 2 | 3 | 4 | 5 |
| | Total point | 28 | 31 | 44 | 60 | 62 |

EXAMPLE 2

A koji was made and charging was carried out by the same procedure as in Example 1. Twenty five days after the charging, 1 kiloliter of juice (NaCl 17.20%, T.N. 16.25%, value 6.25) was withdrawn from the shoyu moromi by means of a pump, and used as brewing water. Thus, 735 kg of shoyu koji and 450 liters of 15% aqueous solution of sodium chloride were added to it, and fermentation and ageing were carried out by the usual method for 5 months. Then it was filtered under pressure to obtain a raw concentrated shoyu. Flavor of this raw shoyu was by no means inferior to the flavor of usual raw shoyu produced by natural brewing. Its analyses are shown in Table 4.

On the other hand, the moromi from which 1 kiloliter of juice had been withdrawn in the early stage of brewing was subjected to continued fermentation and ageing by the usual method. Although the moromi thus obtained had a little higher consistency than the moromi produced without withdrawal of juice, it was by no means inferior to the latter organoleptically and in point of component.

TABLE 4

| | NaCl (%) | T.N. (%) | pH | Alc (%) | RS (%) | Value | Glutamic acid (%) |
|---|---|---|---|---|---|---|---|
| Raw shoyu | 12.88 | 2.283 | 4.87 | 3.12 | 5.56 | 2.68 | 2.02 |

1. A process for producing a concentrated shoyu which comprises adding and mixing a shoyu koji into a brewing water, said brewing water present in an amount of 1.25-6.25 times the weight of said shoyu koji, followed by fermenting and aging the mixture at 25°–30° C. for 4–8 months with intermittent agitation, said brewing water being a juice separated from a shoyu moromi 15–60 after the charge of said shoyu moromi and before the start of fermentation of said shoyu moromi.

2. A process according to claim 1, wherein the juice separated from shoyu moromi is diluted with water or aqueous solution of sodium chloride and then used as a brewing water.

3. A process according to claim 1, wherein the brewing water has a sodium chloride concentration of 12–25% and a nitrogen concentration of 0.2–1.8%.

* * * * *

UNITED STATES PATENT AND TRADEMARK OFFICE
CERTIFICATE OF CORRECTION

PATENT NO. : 4,476,144
DATED : Oct. 9, 1984
INVENTOR(S) : Seiji Kitahara et al

It is certified that error appears in the above—identified patent and that said Letters Patent is hereby corrected as shown below: Title page:

Please correct the Abstract to read as follows:

-- ABSTRACT

A process for producing concentrated shoyu is provided wherein the juice separated form a shoyu moromi in the early stage of brewing is employed as the brewing water that is combined with a shoyu koji. The combined shoyu koji and moromi juice is then fermented and processed to produce a concentrated shoyu. --

Col. 5, line 1, "andageing" should read -- and ageing --.

Signed and Sealed this

Sixteenth Day of April 1985

[SEAL]

Attest:

DONALD J. QUIGG

Attesting Officer      Acting Commissioner of Patents and Trademarks